United States Patent [19]

Schnipke

[11] Patent Number: 4,697,742
[45] Date of Patent: Oct. 6, 1987

[54] ADJUSTABLE AND SECURABLE FLUID PIPE JOINT AND NOZZLE COUPLING UNIT

[75] Inventor: Dennis E. Schnipke, Wooster, Ohio

[73] Assignee: Premier Industrial Corporation, Cleveland, Ohio

[21] Appl. No.: 723,187

[22] Filed: Apr. 15, 1985

[51] Int. Cl.[4] .................................................. B05B 15/08
[52] U.S. Cl. ................................... 239/587; 285/310; 285/321; 285/262; 403/90
[58] Field of Search ................... 169/24, 25; 239/587, 239/200, 227, 247, 261, 282, 283; 285/181, 184, 185, 265, 262, 198; 403/57, 58, 113, 88, 90, 74; 284/309, 310, 321

[56] References Cited

U.S. PATENT DOCUMENTS

| 396,710 | 1/1889 | Prunty | 169/25 |
|---|---|---|---|
| 525,487 | 9/1894 | Crawford | 285/184 X |
| 658,516 | 9/1900 | Smith | 285/265 |
| 777,053 | 12/1904 | Wilson | 239/587 X |
| 918,443 | 4/1909 | Greenlaw | 285/262 |
| 1,067,516 | 7/1913 | Gleeson | 285/184 X |
| 1,738,421 | 12/1929 | Corley | 239/280 |
| 2,080,500 | 5/1937 | Norris | 285/262 |
| 2,399,043 | 4/1946 | Klumb | 403/57 X |
| 2,465,373 | 3/1949 | Hall | 285/262 |
| 2,668,081 | 2/1954 | Konter | 239/283 X |
| 2,921,803 | 1/1960 | Tracy | 285/262 |
| 3,235,295 | 2/1960 | Solum | 403/344 X |
| 3,319,982 | 5/1967 | Schwartz | 285/184 X |
| 3,544,137 | 1/1969 | Contreras et al. | 285/261 |
| 3,612,408 | 10/1971 | Holleman | 239/587 |
| 4,171,833 | 10/1979 | Eijhelenboom | 285/261 |
| 4,180,285 | 12/1979 | Rencou | 285/184 X |
| 4,195,692 | 4/1980 | Dion-Biro | 169/25 |
| 4,298,219 | 11/1981 | Amelink | 285/321 X |
| 4,596,362 | 6/1986 | Pralle et al. | 285/185 X |

FOREIGN PATENT DOCUMENTS

| 1115036 | 10/1961 | Fed. Rep. of Germany . |  |
|---|---|---|---|
| 72359 | 7/1947 | Norway | 285/91 |
| 2037922 | 7/1980 | United Kingdom | 285/184 |

Primary Examiner—Andres Kashnikow
Assistant Examiner—Kevin P. Weldon
Attorney, Agent, or Firm—Jones, Day, Reavis & Pogue

[57] ABSTRACT

Ball and socket members having cooperating fluid flow passages therethrough are connected for universal pivotal movement by a connection located entirely interiorly of the members within the fluid flow passages therein. A brake band interposed between the ball and socket members is selectively operable to releasably secure the ball and socket members against movement relative to one another.

19 Claims, 5 Drawing Figures

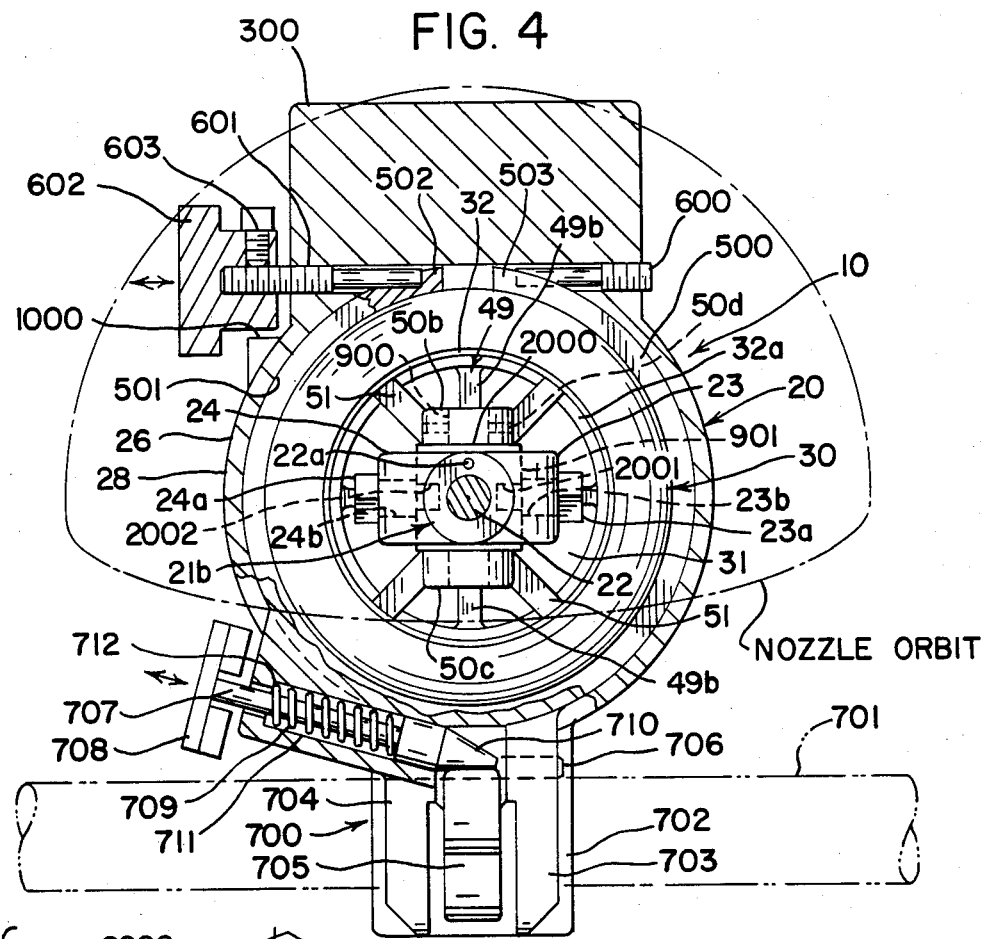
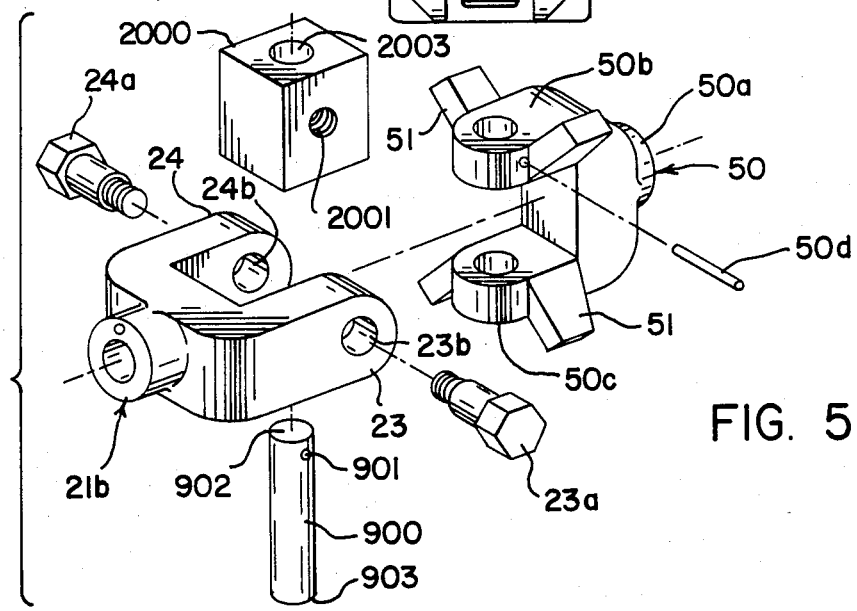
FIG. 4
FIG. 5

ADJUSTABLE AND SECURABLE FLUID PIPE JOINT AND NOZZLE COUPLING UNIT

BACKGROUND OF THE INVENTION

1. Field of the Invention

The invention relates to ball-and-socket type, internally-connected fluid pipe joints, particularly when used as nozzle coupling units.

2. Description of the Related Act, Including Information Disclosed Under 37 CFR §§ 1.97-1.99.

Ball-and-socket joints for fluid pipes, conduits and the like are known to the art. They have been used in a variety of environments to provide substantially universal pivotal movement of the connected members. In many places such joints are required to withstand great flow pressures. In the case of ball-and-socket joints of an early vintage, the friction and binding which was occasioned between the parts by the great internal pressure was such as to make the joint rigid and difficult to operate. In such joints, the direct engagement of the ball-and-socket joint parts was depended upon to hold the parts in proper relation.

To attempt to solve that problem, a number of various ball-and-socket joint constructions were devised. These constructions featured a variety of internal and externally applied joining or coupling devices for holding the ball and socket members in engagement against the internal pressure tending to separate them, while affording relatively free movement of the ball means within the socket. See, e.g., Hawley, U.S. Pat. No. 840,325 (external device); Phillips, U.S. Pat. No. 866,061 (internal device); Forth, U.S. Pat. No. 950,665 (internal device); Koenig, U.S. Pat. No. 979,513 (internal device); Forth, U.S. Pat. No. 1,145,578 (internal/external device); Norris, U.S. Pat. No. 2,080,500 (internal/external device); Morse, et al. U.S. Pat. No. 2,921,803 (internal device); and Tracy, et al., U.S. Pat. No. 2,761,701 (internal device).

While these constructions were alleged to alleviate the difficulty in adjustment of the joint, particularly where high pressure flows were encountered, those difficulties continued. The curvative devices had to be configured so as to take just the right degree of strain off the ball-and-socket, yet provide sufficient fit to avoid leakage. This was especially the case where it was desired that the joint be maintained in a fixed orientation after adjustment. The known constructions favored continual adjustment, having no means whatever to lock in or maintain a desired orientation after it had been obtained.

The only structure that presented an undisclosed potential for maintaining a desired orientation was that of Forth U.S. Pat. No. 1,145,578. Theoretically, one might have been able to tighten, with an appropriate tool, confining nut 6 sufficiently so that spiral spring 7 would exert enough force to hold member 4 in a desired orientation with respect to member 2. The force of fluid flow, however, is always parallel to bolt 5 in Forth's structure, and hence parallel to the direction of restraining force exerted by spring 7. It thus would always be attempting to overcome the bias of the spring, which would occur with greater ease as the age of the device increased and the spring's force diminished. This would result in alteration of the relative position of members 2 and 4 and loss of the desired orientation.

Even if one had attempted to lock the Forth device into a desired orientation, tools and time would always be necessary to go from a first, locked-in orientation of members 2 and 4 to a second, locked-in orientation. Continued tightening and untightening of confining nut 6 would also hasten the aging and weakening of spring 7, making loss of the desired orientation all the more probable.

The known internal devices for holding the ball and socket members in engagement against the internal pressure also were susceptible to failure in continued, high pressure service. The internal devices, at their points of pivoting and rotation, presented a substantial impediment to fluid flow. This transmitted substantial forces to the pivoting and rotating members, both directly and through flexure or bending of the bolt or rod means used to hold the ball and socket members together. Failures of such devices were known, with often catastrophic separation of the ball and socket members. Moreover, use of these internal devices required a higher inlet pressure to the joint than would otherwise be necessary to maintain a desired outlet pressure, a plainly undesirable attribute.

None of the engagement-device-equipped ball and socket fluid pipe joints presented means for defeating the internal pressure-induced movement of the entire joint itself, with respect to the surrounding environment. In instances where these joints communicated directly to the environment through either their ball or socket member (though such communication through the ball member was more prevalent), such as where a nozzle was attached to the downstream side of the ball means, the escaping fluid, driven by the now-released internal pressure, would through reaction thereto drive, move or ofttimes "fly" the joint about. The extreme danger of such an occurrence is readily apparent, but was overcome only by the expedient of having individuals physically hold the joint against such movement. No other means for securing such a fluid pipe joint to the environment were known—particularly where the flexibility of securing and releasing said joint quickly was desired or necessary.

In addition, direct communication to the environment, such as by a nozzle, produced internal reaction forces which the engagement-device-equipped ball and socket fluid pipe joint had to withstand while operating. Adjustment of the joint when fluid was flowing to the environment was impossible because of the internal back-pressure or reactive forces. And, once again, such joints would ofttimes fail catastrophically by disengagement of the ball and socket or internal engagement devices.

There was a need in the art, therefore, for a ball-and-socket type fluid pipe joint which could overcome these shortcomings. An optimum device would present the following characteristics, in combination, not presented by known devices:

1. the ball-and-socket joint would be provided with internal means to hold the members of the joint in engagement against internal pressure tending to cause their separation, which means would themselves resist pressure-induced flexure, bending and failure at their pivot/rotation points;

2. the ball-and-socket joint would be capable of being locked into a desired ball-to-socket orientation, without the need for tools, and without relying upon locking or biasing forces exerted in a direction parallel to that of fluid flow through said joint;

3. the ball-and-socket joint would be capable of rapid unlocking, movement to a new, desired ball-to-socket orienation, and relocking, even while under fluid flow to an environment; and 4. the ball-and-socket joint would be capable of rapid, releasable securement to means in an environment, without the need for tools, and without hampering or restricting its capability of being locked into a desired ball-to-socket orientation, rapidly adjustable to a second, desired ball-to-socket orientation without release from the environment.

No known ball-and-socket type device is extant, particularly no such device capable of functioning as a nozzle coupling unit, in which the socket member is provided with a hose or other source of fluid, and the ball member is provided with a nozzle for dispensing or dispersing the fluid into an environment.

SUMMARY OF THE INVENTION

The present invention relates to a fluid pipe coupling which provides fluid passage through pipe, conduits, nozzles and the like which it couples together. The coupling of the invention comprises, in combination, a substantially hollow ball member having a fluid flow passage therethrough, a socket member in which said ball member is seated, having a fluid flow passage therethrough, and substantially longitudinally extending, universal joint internal connecting means, carried by said socket member and pivotally connected to said ball member, so as to allow movement relative to said socket member on at least two transverse axes disposed in fixed angular relation to each other. A split circumferential brake band interposed between the ball and socket members is selectively movable, by operation of adjustment means, between one position securing the ball and socket against relative movement and another position releasing the ball and socket for relative movement.

The coupling of the invention is particularly effective when attached to the end of a flexible hose or other source of fluid flow, through the socket member, and a nozzle or other means of distributing flowing fluid to an environment is attached to the ball member, fluid flowing from the hose to the socket member, to the ball member and then to and through the nozzle.

The internal design of the coupling of the invention affords low friction loss as fluid, particularly water, flows through. As a result, little pressure drop is suffered by fluid transiting through the coupling, thereby providing a desired operating pressure downstream of the coupling.

The universal joint, internal connecting means which couples the seatingly-engaged ball and socket, allows the direction or orientation of the discharge from the coupling to be adjusted, while maintaining engagement of the ball and socket under high fluid flow and pressure. The universal joint, in combination with the split circumferential brake band, allows the orientation of the ball member to the socket member to be locked into a permanent position, without reliance on restraining force applied in a direction parallel to the flow of fluid. By loosening the band through the adjustment means, sufficient freedom of movement between the ball and socket results so that, even while the coupling is flowing fluid, the orientation of the ball member to the socket member may be adjusted and then secured, by tightening the band.

Adjustment of the orientation of the ball to the socket, in a preferred embodiment of the coupling of the invention, may be effected at high fluid pressures, for example, at pressures up to and including 200 psi. The split circumferential brake band will continuously maintain the desired orientation at such fluid pressures.

The fluid pipe coupling of the invention also comprises an embodiment including outwardly extending, releasable securement means, by which the coupling can be releasably secured to an another structure. Securement may be made to another structure—such as to pipes, eye stays, loop means, staples, shackles, bridge means, straddles or the like. Recessed tiedowns or padeyes provided on decks or superstructure of ocean-going vessels are examples of such in-place securement means. Alternatively, a securing plate or anchor may be placed in the environment, and a coupling of the invention secured to it. The releasable securement means are oriented so as not to interfere with the ball-to-socket orientation adjustment means.

The present invention overcomes the lackings and drawbacks of the existing fluid pipe couplings, by providing a ball-and-socket type, fluid pipe coupling wherein the ball-and-socket joint is provided with internal means to hold the members of the joint in engagement against internal pressure tending to cause their separation, which means themselves resist pressure-induced flexure, bending and failure at their pivot/rotation points; the ball-and-socket joint is capable of being locked into a desired ball-to-socket orientation, without the need for tools, and without relying upon locking or biasing forces exerted in a direction parallel to that of fluid flow through said joint; the ball-and-socket joint is capable of rapid unlocking, movement to a new, desired ball-to-socket orientation, and relocking, even while under fluid flow to an environment; and the ball-and-socket joint is capable of rapid, releasable securement to means in an environment, without the need for tools, and without hampering or restricting its capability of being locked into a first, desired ball-to-socket orientation, and thereafter rapidly adjusted to a second, desired ball-to-socket orientation without release from the environment.

Accorgingly, it is an object of this invention to provide a fluid pipe coupling having internal means to hold the members of the joint in engagement against internal pressure tending to cause their separation, which means resist pressure-induced flexure, bending and failure at their pivot-rotation points, yet also having the ability of being locked into a desired ball-to-socket orientation without the need for tools, and without relying upon locking or biasing forces exerted in a direction parallel to that of fluid flow through the joint.

It is yet another object of this invention to provide such a fluid pipe coupling capable of rapid unlocking, movement to a new, desired ball-to-socket orientation, and relocking while under fluid flow, particularly fluid flow to an environment.

Finally, it is an object of this invention to provide such a fluid pipe coupling capable of rapid, releasable securement to means in an environment, without the need for tools, and without hampering or restricting its capability of being locked into a first, desired ball-to-socket orientation, and thereafter rapidly adjusted to a second, desired ball-to-socket orientation without release from the environment.

Other objects of this invention will become apparent upon reading the following detailed description and appendix claims.

BRIEF DESCRIPTION OF THE DRAWINGS

FIG. 4 is a cross-sectional end view taken along section line 4—4 in FIG. 3.

FIG. 5 is an exploded perspective view of a portion of the preferred internal coupling means.

DESCRIPTION OF THE PREFERRED EMBODIMENT

Figure 1:
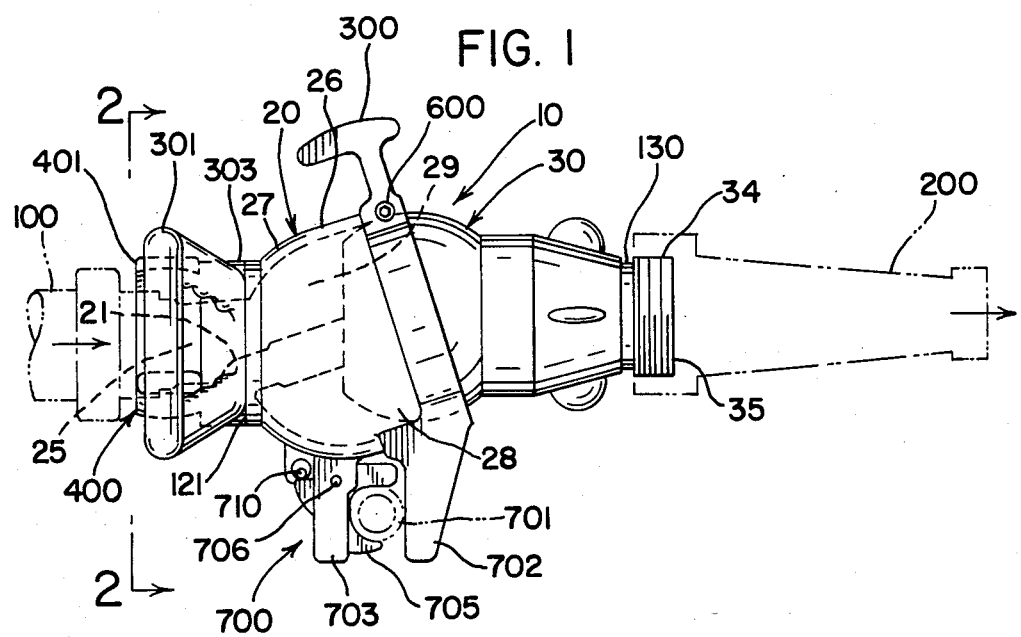
FIG. 1 is a side elevation view of the fluid pipe coupling, shown in a nozzle holder embodiment.
Figure 2:
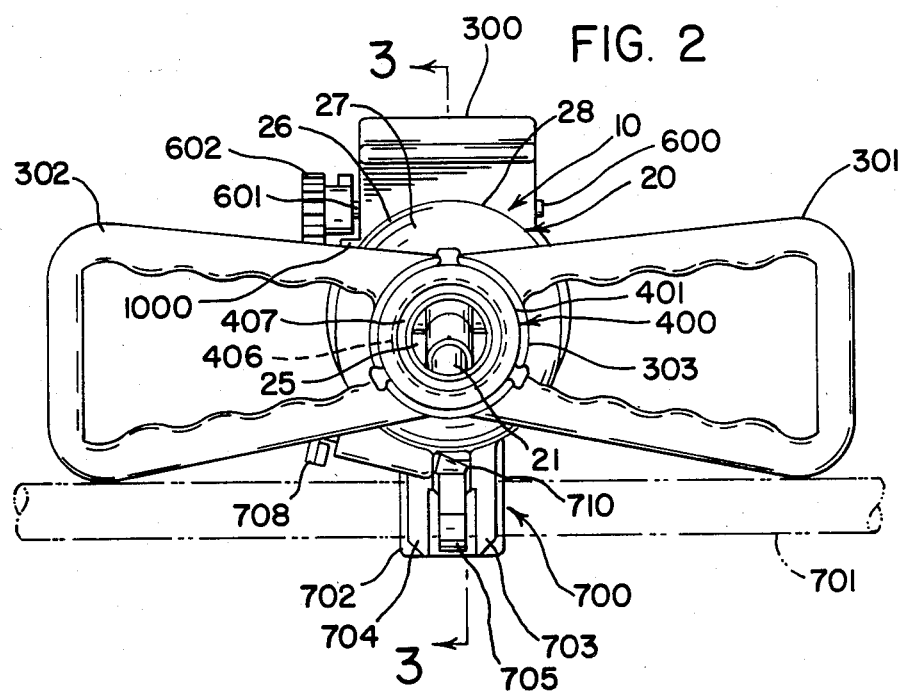
FIG. 2 is an end view taken along section line 2—2 in FIG. 1.

The preferred embodiment is best described by reference to the drawings. FIG. 1 shows a pipe joint coupling of this invention 10, to which fluid supply means 100 and nozzle means 200 (shown by phantom lines) have been attached. The direction of fluid flow through the supply means 100, the coupling 10 and the nozzle 200 is shown by the arrows. (In this figure, fluid flow is from the left to the right.) A lifting handle 300 is provided to afford the ready grasping and vertical lifting of coupling 10. Handle 300 also provides protection against damage caused by dropping coupling 10 or damage caused by objects striking the coupling. Side grasping handles 301 and 302 (FIG. 2) are provided at opposite sides of the exterior of socket member 20. These handles may be grasped by one person separately, for side to side movement of coupling 10, or in combination with handle 300, for lifting movement. Most preferably, each of side grasping handles 301 and 302 may be grasped by an individual, either to move the coupling 10 or to play fluid exiting from the shank portion 130 of ball member 30 through nozzle means 200 about an environment in which said coupling is located.

Figure 3:
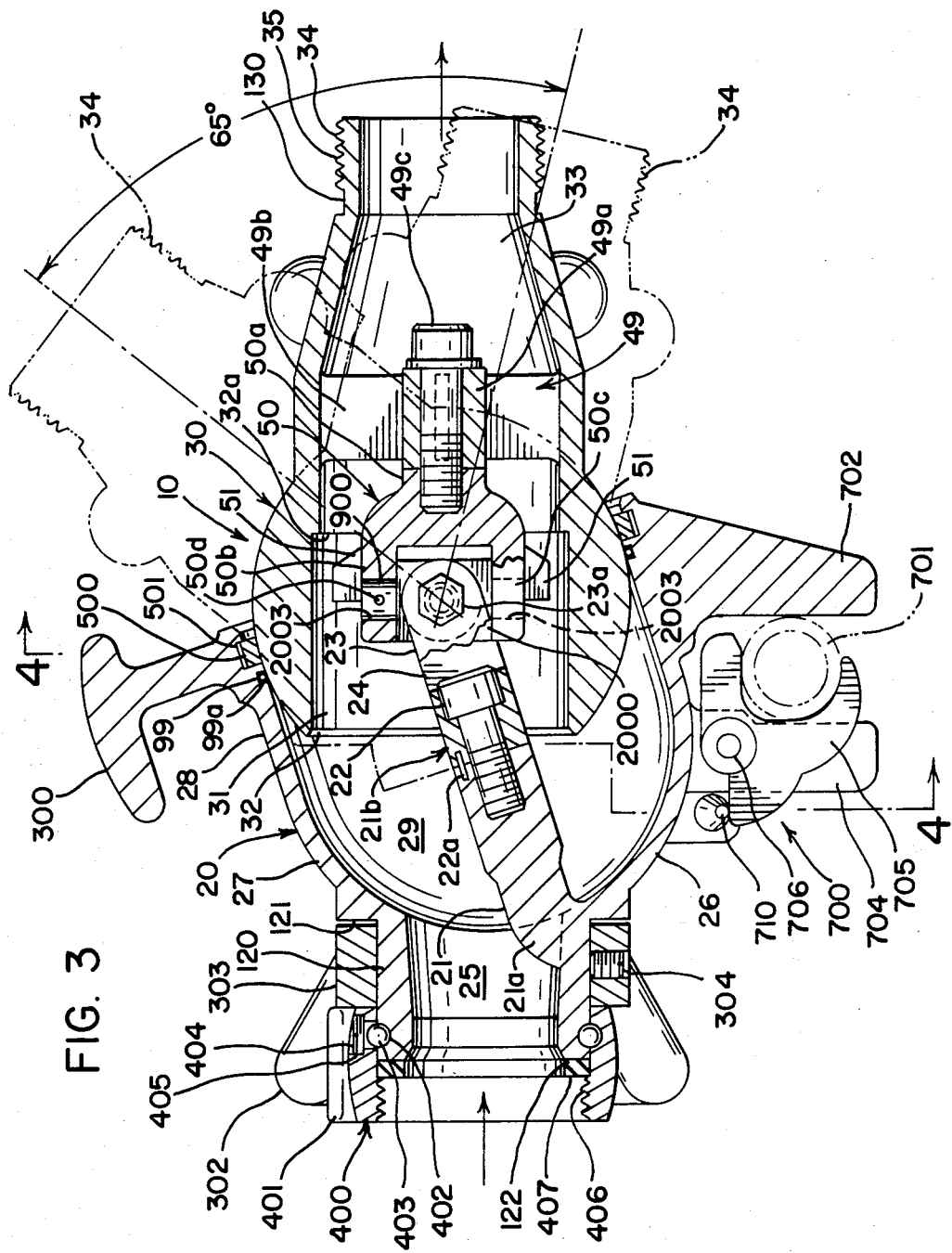
FIG. 3 is a cross-sectional side view taken along section line 3—3 in FIG. 2.

Handles 301 and 302 are joined to a longitudinally and rearwardly extending shank portion 120 of socket member 20. They may either be cast or manufactured separately and joined to said shank portion 120, or they may be integrally cast as part of said socket member 20. FIG. 3 shows annular collar member 303, to which each of handles 301 and 302 are joined, such as by integral casting therewith, which slidably engages with the external surface of shank portion 120. The annular collar member 303 is slid along shank portion 120 until it contacts annular abutment wall 121, whereafter tightening of set screw 304 secures said member 303 and handles 301, 302 to socket member 20. Other means of attachment known to the art may also be used to join handles 301, 302 to socket member 20.

Rearwardly-extending, cylindrical shank portion 120 of socket member 20 is also provided with attachment means 400 for securing an externally threaded (male) supply means of fluid flow to coupling 10. FIG. 1 shows fluid supply means 100 attached to the coupling by said means 400. Attachment means 400, as shown in FIG. 3, comprises swivel joint 401, an annular collar or sleeve extending rearwardly from and surrounding at least a part of shank portion 120 of socket member 20. Swivel joint 401 is rotatably secured to the external surface of shank portion 120 by means of swivel joint bearings 403, which seat in a bearing race 402 which extends circumferentially around said external surface of shank portion 120 of socket member 20. The swivel joint is assembled to the shank portion 120 by removing the threaded, swivel joint bearing plug 404 from tapped hole 405 in swivel joint 401, sliding joint 401 into engagement with the external surface of shank portion 120 and aligning hole 405 with bearing race 402, and then dropping a sufficient quantity of bearings 403 into hole 405 and into race 402 to fill the race and thereby secure the joint 401 to said shank. Replacement of plug 404 prevents bearing escape.

Swivel joint 401 bears internal (female) threads 406 extending through a portion of the interior of the swivel joint. The unthreaded interior portion comprises gasket 407, which abuts end face 122 of shank portion 120 of socket member 20. Gasket 407 may be constructed of any of the well-known, compressible gasket materials, such as Neoprene or the like. When joining fluid supply means, such as means 100, to coupling 10, swivel joint 401 is rotated about the longitudinal axis of shank portion 120 to threadingly engage the external threads of means 100. Continued rotation of swivel joint 401 draws the end of means 100 inwardly toward gasket 407 and end face 122, compressing said gasket and drawing said means 100 together with coupling 10. Swivel joint 401 rotation becomes difficult when the maximum desired gasket 407 compression is attained; cessation of rotation leaves a substantially leak-proof joint.

Of course, other coupling means and methods of supplying fluid flow to and from coupling 10 may also be utilized.

FIGS. 1 and 3 show passage 25, which runs longitudinally through the interior of shank portion 120. Ideally, fluid passage 25 is cylindrical and axially coincident to the longitudinal axis of shank portion 120. In such a case, shank portion 120 comprises an annular member projecting rearwardly from the body portion 26 of socket member 20. Body portion 26 in turn comprises a hemispherically-shaped inlet portion 27, and an elongated, substantially cylindrical side portion 28, which together form socket 29. The socket's internal diameter is dimensioned to fit appropriately with the external surface of ball member 30.

The longitudinal axis of shank portion 120 is most preferably angularly displaced from the longitudinal axis of socket 29. Optimally, the internal socket axis makes an acute angle with that of the shank portion. Of course, there may be no angular displacement between these axes, if desired, such that they lie coincident one to the other. The angular displacement provides, in the embodiment of FIG. 1, for the proper discharge angle of nozzle 200.

Outwardly and downwardly depending from the exterior of socket member 20 is releasable securement means 700. Releasable means 700 secures to an environment by any suitable means, such as structural means 701 illustrated in FIGS. 1–4. Means 700 generally comprises a group of fixed, depending and extending finger or tab means, members of which are disposed in opposition to each other, which surround the structural means 701. The preferred embodiment includes three such finger or tab means: An abutment finger 702, and two latch fingers, 703/704. Abutment finger 702 opposes fingers 703/704, thereby surrounding structural means 701. To secure coupling 10 to means 701, latch 705 is provided. Optimally, latch 705 is configured so that its inner contacting surface is substantially identical in shape to the outer surface of structural means 701. This is readily done, where the shape of structural means 701 is known and regular. Latch 705 pivots about the axis of latch pivot 706, shown in FIG. 4. Latch 705 may preferably be spring-loaded, so as to open on disengagement of lock pin 707.

In circumstances where a variety of structural means may be encountered, the shape of one or more of fingers 702, 703 and 704 may be altered. Finger 702 may take on a rearwardly extending hook shape, the open portion facing fingers 703/704. Latch 705 means also may be of hook shape, forwardly extending so that its open portion faces finger 702.

FIGS. 1–4 illustrate lock pin means as part of releasable securement means 700. Lock pin 707 is provided with lock pin tip 710, which has a cylindrical body portion terminating in a frusto-conical tip portion (see FIG. 4). The frusto-conical tip portion bears on a camming surface of latch 705, being biased against said latch by the action of spring 709. Pin 707 is slidably disposed with spring 709 within cylindrical cavity 711, the cylindrical body portion of pin tip 710 being dimensional so as to slidingly engage the surface of said cavity. The portion of pin 707 which extends from tip 710 is of a lesser diameter, spring 709 surrounding said portion and being confined within the cavity 711 between end wall 712 and the rear wall of said cylindrical body portion of tip 710. The distal end of lock pin 707 passes through a wall portion of socket 20, terminating in handle 708. Withdrawal of pin 707 by means of handle 708 releases latch 705, allowing disengagement of coupling 10 from means 701.

To aid in preventing undesired horizontal rotation or movement of coupling 10, handles 301, 302 are most preferably proportioned so as to contact the environmental means 701, or the surrounding environment (see FIG. 1). The contact of both handles 301, 302 effectively secures coupling 10 against any such rotation.

The interior surface of socket 29 bears a circumferential packing cavity 99, filled with suitable O-ring 99a, which serves to seal the joint between said surface and the external surface of ball member 30. Cavity 99 is preferably located interiorly to said socket from circumferential split brake band 500.

Circumferential split brake band 500 is substantially ring shaped in configuration, similar to the configuration of piston rings used in an internal combustion engine. Band 500 is enclosed within brake band cavity 501, which is disposed in the interior surface of socket 29 of socket member 20, such that at least a portion of the internal surface of said band 500 effects circumferential contact with ball member 30. Band 500 is split, as shown in FIG. 4, and has two opposing ends 502, 503. The split in said band is oriented so as to lie at the top center of brake band cavity 501, centered beneath lifting handle 300.

FIG. 4 illustrates the adjustment means for applying clamping pressure to the surface of ball member 30. End 503 is contacted by adjustment screw 600. Screw 600 is threaded at its outer portion where it contacts mating threads in that part of socket member 20. But is is unthreaded where it contacts end 503, such that it acts as a contact stud at that point. The outermost end of adjustment screw 600 may be configured to accept any desired driving means, such as a flat blade or Phillips head tool, or a hexagonal, Allen key or equivalent. By adjustment of said screw 600, the width of the gap between ends 502 and 503 may be varied, when opposing main adjustment screw 602 is fully advanced into socket member 20.

Like screw 600, main adjustment screw 601 is threaded at its outer portion, where it contacts mating threads in that part of socket member 20. Its inner portion, the end of which contacts end 502 of band 500, is unthreaded, acting as a contact stud at that point. The outermost end of screw 601 is provided with knob 602, which is attached to screw 601. Stop screw 603 is also provided to limit the rotation of screw 601 by contact with stop shoulder 1000 on socket member 20. By rotating screw 601 all the way into socket member 20, and setting screw 600, the amount of rotation of knob 602 necessary to loosen and re-tighten band 500 around the external surface of ball member 30 may be controlled. Optimally, less than one full revolution of the knob is sufficient to loosen band 500, with less than one full revolution in the opposite direction being sufficient to tighten said band. By such means, ends 502 and 503 are forced to move in a plane substantially parallel to the surface of ball member 30, along the point of circumferential contact between band 500 and that surface.

Alternatively, setting screw 600 can be replaced by a combination of an externally threaded adjustment screw and an unthreaded pin, which is disposed between the distant end of said screw and end 503 of circumferential split brake band 500. The unthreaded pin is capable of relatively free movement with respect to the distal end of said adjustment screw and said end 503, which allows the end of said pin to stay in substantial contact with end 503. A similar combination arrangement may be substituted for screw 601.

The clamping force applied to the surface of ball member 30 is thus applied in a direction transverse or perpendicular to the flow direction of fluid in socket 29. The width of the face of the band 500 contacting said surface is selected so as to provide sufficient contact area and gripping force to maintain said ball in the orientation selected with respect to said socket member. To vary that orientation, one need only loosen band 500 by rotation of knob 602, orient ball member 30 by hand manipulation of its position, and rotate knob 602 to re-secure said member 30. Due to the direction of clamping force, fluid flow does not tend to loosen and re-orient ball member 30, nor bind ball member 30 against socket member 20 so as to prevent re-orientation.

The preferred arrangement of the internal connecting means is shown in FIGS. 3, 4 and 5. Finger stud 21 extends from the internal end of fluid passage 25 longitudinally inward and toward the open end of socket member 20 and socket 29, said open end being the portion in which ball member 30 is seated. Most preferably, the central axis of stud 21 is coincident with the central axis of socket 29 of socket member 20. By such axial alignment, friction loss and pressure drop of flowing fluid is minimized, as the stud 21 extends parallel to the flow path and does not break or substantially disrupt same.

Stud 21 comprises two pieces: The proximal end, 21a which is integrally cast as part of socket member 20, and a distal end 21b, which is fastened to said proximal end by bolt 22. A pin, 22a, is also provided at the juncture of the proximal and distal ends, to prevent rotation of distal end 21b about the longitudinal axis of the stud. The bolt head of bolt 22 is preferably configured for a hexagonal, Allen key or equivalent, and is counterbored into the surface of said distal end 21b (see FIG. 3).

The configuration of distal end 21b of stud 21 is shown in FIGS. 4 and 5. End 21b is substantially Y-shaped, with the portion extending outwardly past the head of bolt 22 comprising the top of the Y such that, if viewed in isolation, that portion is substantially U-shaped. The U opens in an outward direction, with respect to socket 29. The two legs of the U, 23 and 24, are each fitted with a transverse pivot pin, 23a and 24a respectively. The portions of each pin which engage the legs are smooth surfaced, as are the interior of the cavities 23b, 24b which pass through legs 23, 24. These portions thus act as journalled bearing surfaces for rotation about their common axis, which lies transverse to the axis of said U-shaped portion of end 21b. The distal ends of each pin, which extend inwardly from legs 23, 24, are externally threaded, so as to engage with the internal threads in cavities 2001, 2002 of bearing block 2000. This arrangement prevents bending of legs 23, 24 outwardly when they are exposed to the reactive forces of high pressure flow to an environment.

Ball member 30 is substantially hollow, as shown in FIG. 3. Fluid flow passage 31 extends through said member 30, having an entrance portion 32 and an exit portion 33. The longitudinal axis of passage 31 is preferably coincident to the center line of the hemispherical ball portion of member 30. Ball member 30 also has a longitudinally extending shank portion 34, comprising an annular cylinder whose longitudinal axis is likewise coincident to said center line of the hemispherical ball portion of member 30.

Entrance portion 32 of passage 31 is of a slightly larger diameter than the middle portion thereof, providing annular shoulder 32a in said passage. Exit portion 33 may present parallel interior walls, or diverging or converging interior walls substantially frusto-conical in shape (see FIG. 3), until it contacts shank portion 34. Shank portion 34 is most preferably provided with external (male) threads (35), by which further fluid flow connections downstream of said coupling may be made (such as to a nozzle, as shown in FIG. 1).

When seated in socket member 20, the longitudinal center line of said member and its surface 29, and the diametric center of brake band 500 lie substantially coincident with the diametric center of said hemispheric portion of said ball member 30 and the longitudinal center line of passage 31 therethrough. The transverse axis of transverse pivot pins 23a, 24a in U-shaped distal end 21b of finger stud 21 is also, most preferably, substantially coincident with that point.

Transverse pins 23a, 24a in turn engage bearing block 2000 (see FIGS. 4 and 5) Bearing block 200 consists of a substantially cubic piece of metal, preferably brass, having transverse threaded cavities 2001, 2002 and perpendicularly, smooth-surfaced cavity 2003. The axis of cavity 2003 is disposed perpendicularly to the transverse axis of cavities 2001, 2002, as may be seen in FIGS. 5. A pin 900, preferably cylindrical in shape, and formed of a material suitable for bearing engagement with bearing block 2000, is journalled within cavity 2000. Pin 900 is dimensioned such that its end portions 902, 903 each project outwardly, in diametric opposition, and extend from bearing block 2000. Cavity 901 is provided in pin 900 for engagement with assembly pin 50d, as hereafter described.

Passage 31 contains a spider crosspiece 49, mounted proximate to the beginning of the frusto-conical end portion 33. Said spider crosspiece 49 comprises a central hub portion 49a, and at least two diametrically opposed radial arms 49b, which are fixedly attached to the inside surface of fluid passage 31. Hub 49a is drilled through to receive bolt 49c rotatable therein, the end of said bolt projecting beyond said hub in a rearward or upstream direction. The head of bolt 49c is preferably configured for a hexagonal, Allen wrench key.

Rearwardly and longitudinally depending from hub 49a of spider crosspiece 49 is Y-shaped receiving means 50. As with distal end 21b of finger stud 21, means 50 is substantially U-shaped above the base portion 50a, having opposing arms 50b, 50c. Base portion 50a is drilled and tapped for threading engagement with the end of bolt 49c which extends beyond the end of hub 49a. Each of arms 50b, 50c contains passages in which extending end portions 902, 903 of pin 900 are non-rotably disposed: Assembly pin 50d serves to secure upper arm 902 of said pin 900, by passage through cavity 901, in receiving means 50. When assembled, pin 900 serves as a vertical bearing with respect to bearing block 2000, providing rotation about the vertial axis of such pin 900 to receiving means 50, and hence movement of ball member 30 in a plane parallel to that of the axis of transverse pivot pins 23a, 24a.

As a result of the construction and assembly of distal means 21b of finger stud 21, bearing block 2000, pin 900, and Y-shaped receiving means 50 (see FIG. 5), the receiving means 50 may rock or move with respect to the distal end of the finger stud on two axes disposed at right angles to each other, the one being formed by the oppositely extending, outwardly projecting end portions 902, 903 of pin 900, and the other by the transverse pivot pins 23a, 24a. The two axes are coplanar although right angularly disposed to each other. The curvature of the external surface of the hemispherical portion of the ball member 30 is such that the point of intersection of the two axes is situated at the internal center of this surface. As a result, the strain on said interconnecting means is uniform and unaffected by any difference in flexure or bending direction assumed by the various components of said means.

Y-shaped receiving means 50 preferably further comprises outwardly extending radial webs 51. At least two such diametrically opposed webs 51 are presented, though most preferably four such webs 51 are utilized, as shown in FIGS. 4 and 5. These webs cause back-pressure stresses to be compressive, rather than distorting or bending forces, with respect to receiving means 50.

In a preferred embodiment of the invention, however, webs 51 extend to and effect contacting engagement with the interior surface of passage 31, but are not fixedly attached thereto. Hence, if bolt 49c is torqued lightly, to a maximum of about 5 lb./in., hub 49a will be capable of rotation about the longitudinal axis of bolt 49c. Y-shaped receiving means 50 does not itself rotate about that axis; however, as webs 51 are not fixedly attached to passage 31, ball member 30, to which spider crosspiece 49 is fixedly attached, may rotate about said longitudinal axis. Further tightening of bolt 49c will restrict and eventualy cease that rotation.

Although not fixedly attached to the interior surface of passage 31 in said preferred embodiment, the webs 51 do substantially contact said surface. In this embodiment, the contact of webs 51 with the interior of passage 31 substantially eliminates any flexure of the two transverse axes of rotation through pin 900 and pins 23a, 24a by restricting transverse motion or play about the longitudinal center line of passage 31. This leads to an extremely stable interconnection between ball member 30 and socket member 20 even at very high fluid flow and pressure, including that resulting from direct discharge from the coupling, such as through nozzle 200 in FIG. 1, to an environment. Lack of flexure and bending also reduces friction loss and pressure drop through the coupling by minimizing movement-induced turbulence and breaks in the flow pattern.

Alternatively, webs 51 may each be fixedly attached to the inner surface of passage 31, by suitable means, such as welding or brazing. This will prevent rotation of ball member 30 about bolt 49c and hub 49a of spider crosspiece 49.

FIG. 3 illustrates a preferred arc of potential angular displacement of greater than 35° in the vertical plane, although any desired angular displacement may be effected through appropriate construction of the elements of coupling 10. Side-to-side potential angular displacement of greater than 65° in the horizontal plane is shown in FIG. 4. The compound maximum potential nozzle orbit for a nozzle, such as shown in FIG. 1, is shown in FIG. 4 by the broken line track.

The shank portion 34 of ball means may be positioned anywhere within that envelope, subsequent to securing coupling to the environment with releasable means 700, ball means 30 locked in position by band 500, and high pressure fluid flow commenced. Should a change in direction of fluid discharge become necessary, band 500 is loosened, the ball member re-oriented, and re-locked by tightening band 500. With band 500 loose, firm hand pressure will move ball member 30 with respect to socket member 20. The interconnecting means of the invention are fitted such that no more than the necessary play is provided in the structure to effect re-orientation on the application of hand force.

The coupling of the invention is particularly efficacious when used with fluid flow means and nozzle discharge means, as illustrated in FIG. 1, for firefighting purposes. An optimum application of the couplng is for shipboard firefighting, where the engagement means can be used to lock the coupling to a ship's deck or superstructure; the ball member adjusted to play fluid upon the fire; and the coupling left unattended, with fluid flowing but no personnel at hand. This allows personnel to withdraw from areas of intense heat and, more particularly, from areas such as magazines and the like where great danger of explosion is present, yet continue to fight the fire.

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

I claim:

1. A fluid pipe coupling for the passage of fluid therethrough, comprising, in combination, a substantially hollow ball member having a fluid flow passage therethrough, a socket member in which said ball member is seated, having a fluid flow passage therethrough, and substantially longitudinally extending, internal connecting means, carried by said socket member and pivotally connected to said ball member, so as to allow movement relative to said socket member on at least two transverse axes disposed in fixed angular relation to each other, wherein the improvement comprises:
    a. a split circumferential brake band having oppositely disposed band ends, said band being disposed with respect to the interior surface of said socket member so as to substantially surround and circumferentially contact at least a portion of the external surface of said ball member, and
    b. adjustment means in communication with at least one of said band ends, whereby said one end may be moved toward or away from the other said end in a direction substantially parallel to the external surface of said ball member, thereby securing or releasing said ball member for movement with respect to said socket member.

2. The combination of claim 1, wherein said adjustment means threadingly engages said socket member, such that rotation of said adjustment means effects movement of said band end.

3. The combination of claims 1 or 2, wherein said ball member further comprises internally disposed, substantially U-shaped receiving means for pivotally connecting said connecting means to said ball member, said receiving means contacting the interior of said ball means by at least two oppositely disposed web means extending radially from said receiving means.

4. The combination of claims 1 or 2 wherein said socket member further comprises outwardly extending, releasable securement means, disposed so as not to interfere with said adjustment means, whereby said coupling may be releasably secured to structural means.

5. The combination of claim 3 wherein said socket member further comprises outwardly extending, releasable securement means, disposed so as not to interfere with said adjustment means, whereby said coupling may be reasonably secured to structural means.

6. The fluid pipe coupling of claims 1 or 2 further comprising nozzle means attached to said ball member, and fluid supply means attached to said socket member, whereby fluid flow is provided through said coupling to said nozzle means.

7. The fluid pipe coupling of claim 3, further comprising nozzle means attached to said ball member, and fluid supply means attached to said socket member, whereby fluid flow is provided through said coupling to said nozzle means.

8. The fluid pipe coupling of claim 4, further comprising nozzle means attached to said ball member, and fluid supply means attached to said socket member, whereby fluid flow is provided through said coupling to said nozzle means.

9. The fluid pipe coupling of claim 5, further comprising nozzle means attached to said ball member, and fluid supply means attached to said socket member, whereby fluid flow is provided through said coupling to said nozzle means.

10. A fluid pipe coupling for the passage of fluid therethrough, comprising:
    a. a socket member, having a fluid flow passage therethrough,
    b. a substantially hollow ball member, having a fluid flow passage therethrough, said ball member being seated within the interior of said socket member and in circumferential contact with a portion of the inner surface of said socket member, whereby said members comprise a ball-and-socket joint,
    c. internal coupling means, whereby said ball member is retained within said socket member, said means comprising:
        1. a finger stud, projecting from an internal wall of said socket member and longitudinally and outwardly along the central axis thereof, toward the open, ball-receiving portion of said socket;

2. universal joint means, attached to the distal end of said stud and disposed internally with respect to said ball member, and 3. spider means, having a hub and at least two diametrically opposed, radially extending arms, to which hub said universal joint means is longitudinally attached, and which hub in turn is radially attached by said arms to the interior of said ball member, and d. a split circumferential brake band having oppositely disposed band ends, said band disposed with respect to the interior surface of said socket member so as to substantially surround and circumferentially contact at least a portion of the external surface of said ball member, and e. adjustment means in communication with at least one of said band ends, whereby said one end may be moved toward or away from the other said end in a direction substantially parallel to the external surface of said ball member, thereby securing or releasing said ball member for movement with respect to said socket member.

11. The fluid pipe coupling of claim 10, wherein said internal coupling means comprises:

a. a finger stud, projecting from an internal wall of said socket member and longitudinally and outwardly along the central axis of the socket portion thereof, toward the open, ball-receiving portion of said socket, the distal end of said stud comprising a U-shaped structure further disposed to receive transverse pivot pin means;

b. a bearing block, interconnected with said U-shaped structure of said finger stud by transverse pivot pin means, whereby said block is rotatable, in a plane perpendicular to said pivot pin means, about the axis of said means, said block further having a passage therethrough, disposed perpendicularly to the axis of said transverse pivot pin means;

c. a pin, rotatably journalled within said passage in said bearing block, said pin being further disposed to provide diametrically opposed, extending end portions projecting from said bearing block;

d. U-shaped receiving means, wherein said diametrically opposed extending end portions of said pin are non-rotatably disposed in the opposing side arms of said means, whereby said bearing block is rotatable, in a plane parallel to that of said transverse pivot pin means, about said pin, and e. spider means, having a hub and at least two diametrically opposed, radially extending arms, to which spider means hub the base of said U-shaped receiving means is longitudinally attached, and which hub in turn is radially attached by said arms to the interior of said ball member.

12. The fluid pipe coupling of claim 10, wherein said universal joint means contacts the interior of said ball member through at least two oppositely disposed web means, extending radially from said universal joint means.

13. The fluid pipe coupling of claim 11, wherein said U-shaped receiving means contacts the interior of said ball member through at least two oppositely disposed web means, extending radially from said universal joint means.

14. The fluid pipe coupling of claims 10, 11, 12 or 13 wherein said socket member further comprises outwardly extending, releasable securement means, disposed so as not to interfere with said adjustment means, whereby said coupling may be releasably secured to structural means.

15. The fluid pipe coupling of claims 10, 11, 12 or 13 further comprising nozzle means attached to said ball member, and fluid supply means attached to said socket member, whereby fluid flow is provided thorugh said coupling to said nozzle means.

16. The fluid pipe coupling of claim 14 further comprising nozzle means attached to said ball member, and fluid supply means attached to said socket member, whereby fluid flow is provided through said coupling to said nozzle means.

17. A fluid coupling comprising: cooperating ball and socket members having fluid flow passages therethrough, said ball member being recieved in said socket member with said fluid flow passages therein communicating with one another, means connecting said ball and socket members for substantially universal pivotal movement relative to one another, seal means interposed between said ball and socket members for sealing same against leakage of fluid from said fluid flow passages, one side of said seal means being subjected to pressure of fluid flowing through said fluid flow passages and the opposite side of said seal means being exposed to atmospheric pressure, and selectively operable brake means cooperatively interposed between said ball and socket members on said opposite side of said seal means for selectively securing said ball and socket members against movement relative to one another.

18. The coupling of claim 17 wherein said means connecting said ball and socket members is located in said fluid flow passages completely internally of said ball and socket members and is completely independent and separate from said brake means.

19. A fluid coupling comprising: cooperating ball and socket members having cooperating fluid flow passages therethrough, means for connecting said ball and socket members for substantially universal pivotal movement relative to one another, brake band means independent of said means for connecting and having spaced-apart opposite band ends and being interposed between said ball and socket members, adjustment means cooperable with said band adjacent one said band end for moving said one band end in one direction for moving said brake band means to a securing position in which said ball and socket members are secured against movement relative to one another, said adjustment means being operable for moving said one band end in an opposite direction for moving said brake band means to a released position in which said ball and socket members are substantially universally pivotal relative to one another, and means for holding the other said band end against movement when said adjustment means is operated for moving said one band end in said one direction.

* * * * *